US009291145B2

(12) United States Patent
Sabourin et al.

(10) Patent No.: US 9,291,145 B2
(45) Date of Patent: Mar. 22, 2016

(54) PROPELLER FOR A HYDRAULIC MACHINE, HYDRAULIC MACHINE EQUIPPED WITH SUCH A PROPELLER, AND A METHOD FOR ASSEMBLING SUCH A PROPELLER

(75) Inventors: Michel Sabourin, Sorel (CA); Sébastien Beaulieu, Sorel (CA)

(73) Assignee: ALSTOM RENEWABLE TECHNOLOGIES, Grenoble (FR)

( * ) Notice: Subject to any disclaimer, the term of this patent is extended or adjusted under 35 U.S.C. 154(b) by 645 days.

(21) Appl. No.: 13/485,677

(22) Filed: May 31, 2012

(65) Prior Publication Data

US 2012/0308397 A1 Dec. 6, 2012

(30) Foreign Application Priority Data

Jun. 1, 2011 (FR) ...................................... 11 54827

(51) Int. Cl.
*F04D 29/18* (2006.01)
*F04D 29/34* (2006.01)
*F03B 3/12* (2006.01)
*F04D 29/32* (2006.01)

(52) U.S. Cl.
CPC ................. *F03B 3/121* (2013.01); *F03B 3/126* (2013.01); *F03B 3/128* (2013.01); *F04D 29/181* (2013.01); *F04D 29/322* (2013.01); *F04D 29/329* (2013.01); *Y02E 10/223* (2013.01); *Y10T 29/49332* (2015.01)

(58) Field of Classification Search
CPC .. F03B 3/121; Y10T 29/49332; Y02E 10/223
USPC .................. 403/309, 335, 337, 341; 416/208, 416/212 R, 212 A, 214 R, 214 A, 244 A, 416/244 B, 245 R, 245 A
See application file for complete search history.

(56) References Cited

U.S. PATENT DOCUMENTS

| 123,274 | A | * | 1/1872 | McCay | ..................... 416/214 R |
| 1,741,787 | A | * | 12/1929 | Moody | ......................... 415/185 |
| 2,611,578 | A | * | 9/1952 | Biggs | ............................. 415/205 |
| 3,002,266 | A | * | 10/1961 | Lynn et al. | .................... 29/889.6 |
| 3,973,876 | A | | 8/1976 | Eyster et al. | |
| 4,150,921 | A | * | 4/1979 | Wennberg et al. | ............ 416/207 |
| 4,930,987 | A | * | 6/1990 | Stahl | ........................... 416/93 A |
| 6,176,680 | B1 | * | 1/2001 | Ringblom et al. | ......... 416/212 R |
| 7,056,092 | B2 | * | 6/2006 | Stahl | ........................... 416/93 A |
| 7,568,560 | B2 | * | 8/2009 | Lin | ........................ 188/218 XL |
| 2012/0308397 | A1 | * | 12/2012 | Sabourin et al. | .......... 416/244 R |

FOREIGN PATENT DOCUMENTS

| FR | 1261800 | 5/1961 |
| FR | 2049789 | 3/1971 |
| JP | 57005561 | 1/1982 |

* cited by examiner

*Primary Examiner* — Ninh H Nguyen
*Assistant Examiner* — Christopher R Legendre
(74) *Attorney, Agent, or Firm* — Buchanan Ingersoll & Rooney PC

(57) ABSTRACT

A propeller for a hydraulic machine includes a hub extending along an axis of rotation of the propeller and vanes extending from the hub and wherein the propeller is formed of several sectors each including a body having a vane attached thereto and wherein the sectors are assembled together by at least one shrunk-on ring which is placed around the bodies. Each sector also includes a side wall and a projection attached to the side wall and which protrudes toward an inside of the hub perpendicularly to the axis (X-X) and wherein at least one washer is connected to the projections inside the hub.

13 Claims, 3 Drawing Sheets

PROPELLER FOR A HYDRAULIC MACHINE, HYDRAULIC MACHINE EQUIPPED WITH SUCH A PROPELLER, AND A METHOD FOR ASSEMBLING SUCH A PROPELLER

The present invention relates to a propeller for a hydraulic machine, notably of the turbine type, as well as to a hydraulic machine equipped with such a propeller, and a method for assembling such a propeller.

In the sense of the present invention, a hydraulic machine may be a turbine, a pump or a turbine pump for example used in a plant for producing hydroelectricity. The propeller of the invention is intended to be crossed by a forced flow of water. In the following, upstream designates the side of a flow which is on a higher level relatively to the downstream of this flow. Such an upstream to downstream flow has the effect of driving the propeller into rotation, when the machine is a turbine. When the machine is a pump, the rotation of the propeller in the reverse direction drives such a flow from downstream to upstream.

Certain hydraulic machine propellers have a diameter of more than 6 meters. It is not very easy, or even impossible, to transport such propellers via a land, sea or air route onto their site of use taking the constraints into account posed by the transport infrastructures. In order to be able to transport such propellers, it is known how to bring them on site in several separate parts, which are assembled on-site. For example, the vanes are welded on-site to a central hub of the propeller. However, such assembling by welding is relatively long and tedious taking into account the large number of welds to be carried out and of the welding equipment to be used. Further, once the vanes are welded on the hub, the periphery of the vanes of the propeller has to be machined in order to adjust the dimensions to the external diameter of the propeller, notably with view to controlling the size of the spacing between an external fairing of the propeller and the end of the vanes. These machining operations are not very easy to perform on-site. Further, conventionally, a thereby assembled propeller has to undergo a heat treatment in order to improve its mechanical characteristics, which also requires bulky equipment which has to be transported on-site.

In order to find a remedy to these drawbacks, it is known how to make a propeller for a hydraulic machine by assembling together several sectors which each consist of a hub portion and of a vane. Thus, document CA-A-874235 proposes the joint assembling of such sectors by means of rings positioned at both axial ends of the hub. These rings are shrunk-on rings: they are heated, which causes their expansion and allows them to be placed around the sectors positioned against each other. Once they are in place, the rings cool down, which causes shrinking of their diameter, so that the rings firmly maintain the different sectors in the assembled configuration.

At room temperature, when a ring is not set into place around the hub, the internal diameter of the ring is less than the diameter of the hub measured in the location where this ring is intended to be placed so as to generate a tightening force. The intensity of this tightening force depends on this diameter difference between the internal diameter of the ring and the external diameter of the hub. The larger this diameter difference, the larger is the tightening force.

The tightening force also depends on the cross-section of the ring and on the mechanical properties of the materials used, notably their stiffness.

Upon heating a ring, the maximum widening of its internal diameter depends on the maximum temperature to which it may be heated without modifying the mechanical properties thereof. Now, it is necessary, during the heating of the ring, that it sufficiently expands so as to obtain a clearance between the internal diameter of the ring and the hub, so as to allow placement of the ring around the sectors. On the other hand, the smaller the diameter of the ring and the less the expansion of the ring is significant.

When the diameter of the hub is small, the use of a shrunk-on ring is not suitable, in particular if it is desired to obtain a consequent tightening force as well as sufficient clearance for allowing placement of the ring.

Further, in the case of small diameter hubs, the geometry of the downstream end of the hub does not generally allow the installation of a shrunk-on ring, for problems of congestion.

U.S. Pat. No. 3,973,876 also discloses a hydraulic machine propeller made from several sectors which each consist of a hub portion and of a vane. Several tension screws are positioned inside the hub, which is hollow, and are used for assembling two sectors opposite the hub. Shrunk-on rings, positioned at each end of the hub, consolidate the assembly. This solution is not suitable when the number of vanes is odd. Further, the shrunk-on rings are not suitable for small diameter hubs. Therefore, the congestion of the hub is relatively significant, which is a penalty to the efficiency of the propeller and to its hydraulic behavior.

Documents US-A-2009/0092495 and US-A-2009/0092496 each disclose a propeller for a hydraulic machine comprising a one-piece central hub on which vanes are assembled. Each vane is firmly attached to a flange and the external surface of the hub is provided with specially adapted areas for receiving the flanges. Bolts are used for attaching the flanges to the hub. The diameter of the hub has to be relatively large in order to allow assembling of the flanges. In certain cases, the diameter of the hub is increased only for the purpose of allowing assembling of flanges, which involves an increase in the dimensions of the whole hydraulic machine. Thus, this solution is expensive. Further, it requires a considerable number of operations for machining the hub and the vanes, which also contributes to increasing the cost of such a propeller.

These are the drawbacks for which the invention more particularly intends to find a remedy, by proposing an easily transportable propeller for a hydraulic machine, and which is easily assembled on-site. Another object of the invention is to propose a propeller, for which the diameter of the central hub is variable and decreases from upstream to downstream, with a relatively small hub diameter at the small diameter end.

For this purpose, the object of the invention is a propeller for a hydraulic machine, intended to be crossed by a flow, the propeller including a hub extending along an axis of rotation of the propeller and vanes extending from the hub. The propeller consists of several sectors, each including a body which, once the sectors are assembled, form together the hub. Each vane is firmly attached to the body of a sector. The sectors are assembled together in order to form the propeller, by means of at least one shrunk-on ring which is placed around the bodies of the sectors. The hub is hollow, each sector comprises a side wall, and a projection which is firmly attached to the side wall, and which protrudes towards the inside of the hub, perpendicularly to the axis. The sectors are further assembled together in order to form the propeller, by means of at least one washer assembled to the projection of each sector, inside the hub, by means of added attachment elements.

By means of the invention, the assembling of the different sectors is achieved both by means of the shrunk-on ring and of the assembling element. The propeller of the invention is particularly adapted to globally conical hubs for which the end of small diameter has a relatively small, or even zero diameter since, in this case, the ring is shrunk onto the end of larger diameter of the hub, which, for most of the time, is of a sufficiently large diameter for allowing efficient shrinking. This allows reduction in the bulkiness of the hub of the propeller and improvement in its efficiency and its hydraulic behaviour. The assembling element is attached inside the hub so that it is not necessary to adapt the external radial surface of the hub, i.e. the hydraulic surface which is wet when operating, for placing attachment elements. Further, such assembling is relatively easy to perform on-site and does not require the transport of elaborate equipment.

According to advantageous but non-mandatory aspects of the invention, such a propeller may incorporate one or several of the following features, taken in any technically acceptable combination:

The hub is globally frusto-conical and has a first axial end, turned towards the upstream of the flow, and a second axial end turned towards the downstream of the flow, the maximum external radial dimension of which, measured perpendicularly to the axis, is less than the maximum external radial dimension of the first axial end.

The ring is shrunk onto the first axial end of the hub.

The first axial end of the hub is extended towards the axis with a wall, which comprises a groove for receiving the ring, the groove extending in a plane perpendicular to the axis.

The attachment elements are formed by bolts and/or pins.

The sectors are one-piece sectors notably made by cast-molding.

The sectors are made by assembling one of the vanes to one of the bodies, notably by welding.

The invention also relates to a hydraulic machine equipped with such propeller.

Finally, the invention relates to a method for assembling such a propeller, which comprise steps wherein:
the ring is shrunk-on around the body of each sector,
at least one washer is assembled to the projection of each sector.

Advantageously, at least one washer is assembled to the projection of each sector by means of added attachment elements, notably bolts and/or pins.

The invention will be better understood and other advantages thereof will become more clearly apparent in the light of the description which follows of a propeller for a hydraulic machine, only given as an example and made with reference to the appended drawings wherein.

Figure 1:
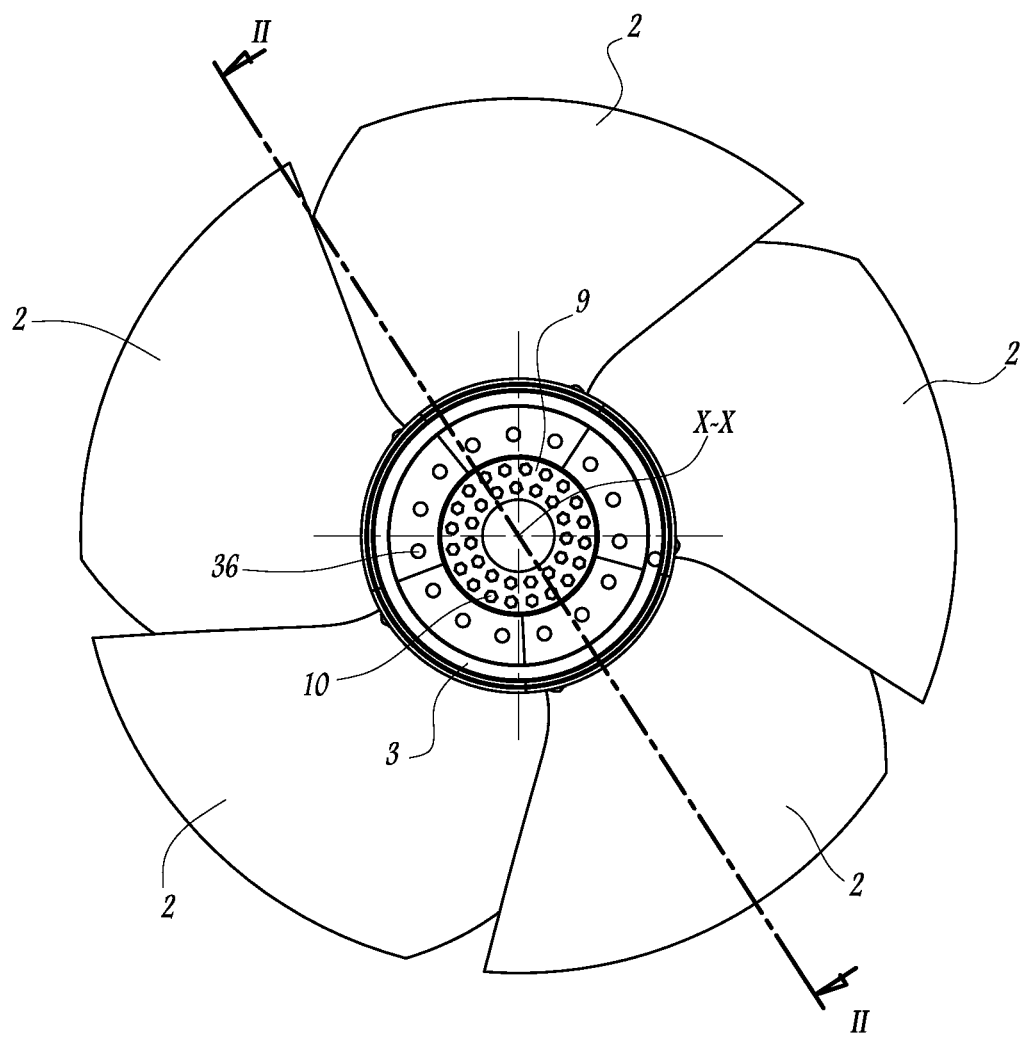
FIG. 1 is a top view of a propeller according to the invention.
Figure 2:
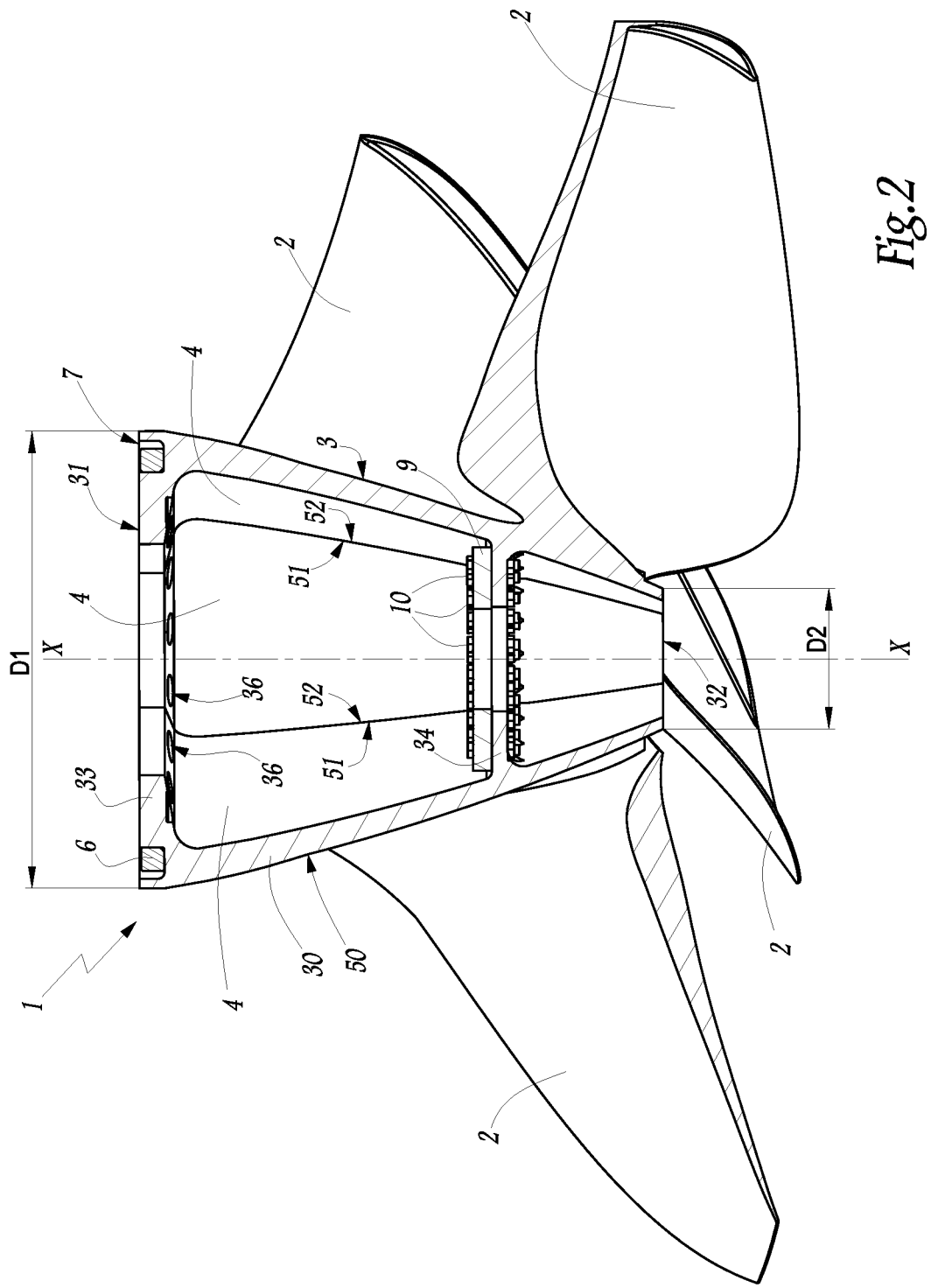
FIG. 2 is a section at a very large scale, along the line II-II in FIG. 1.

FIGS. 1 and 2 show a propeller 1 intended to equip a hydraulic machine, not shown, such as a turbine, a pump or a turbine-pump. During operation, a flow coming from a conduit, not shown, crosses the propeller 1, which then rotates around a central axis X-X.

Figure 3:
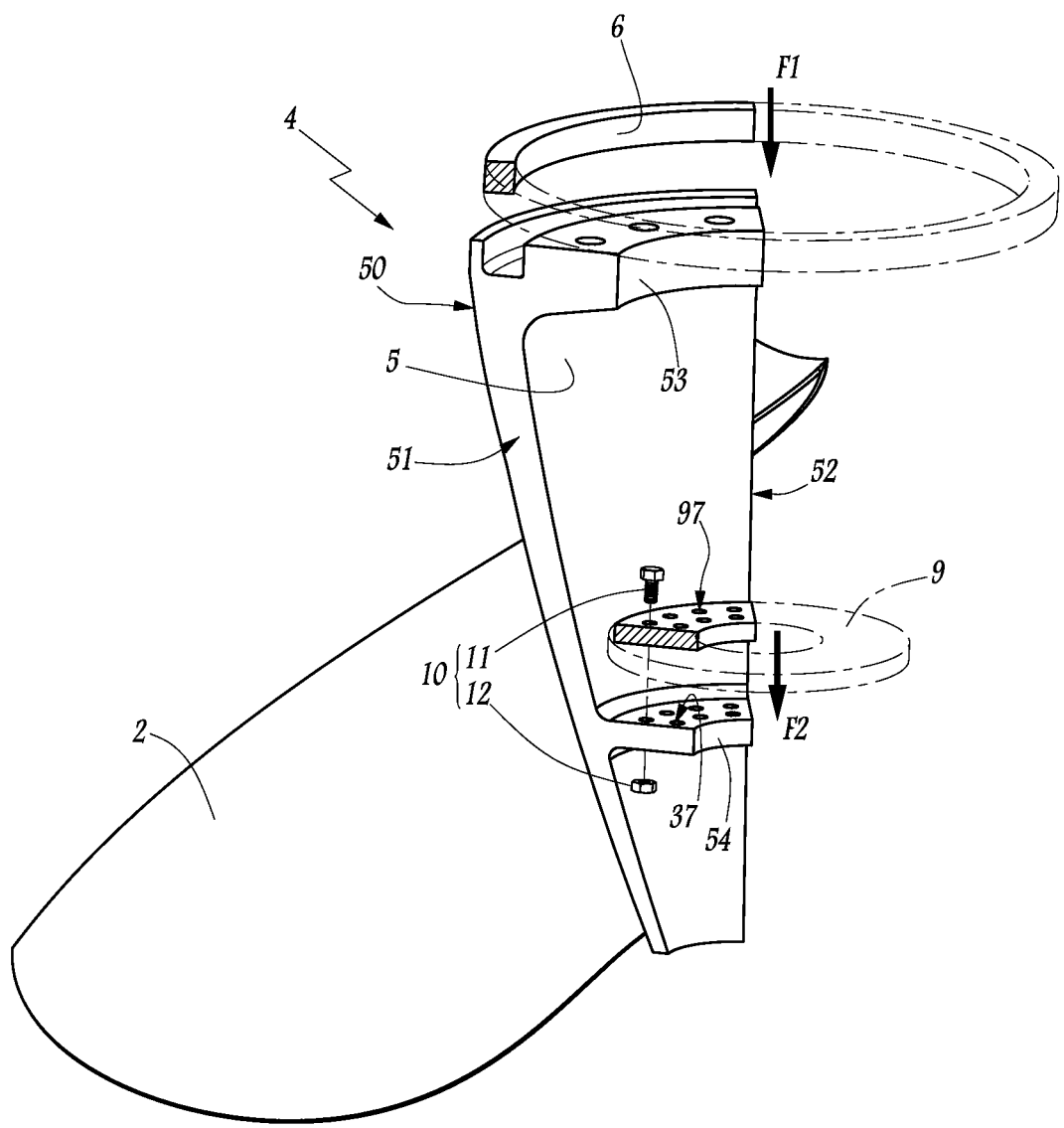
FIG. 3 is a perspective view of one of the sectors from which is made the propeller of FIG. 1, of one portion of the ring and one portion of a washer belonging to the propeller of FIGS. 1 and 2.

The propeller 1 comprises five vanes 2 of a helicoidal shape which are regularly distributed around the axis X-X, and which extend from a central hub 3 of the propeller 1. The hub 3 is hollow and extends along the axis X-X. The hub 3 is globally in the shape of a cone portion with an axis X-X. The propeller 1 is made by assembling five identical sectors, one of which is illustrated in FIG. 3. Each sector 4, the geometry of which is detailed subsequently in more detail, consists of a body 5 firmly attached to a vane 2. The body 5 is intended to form a portion of the hub 3 after assembling the propeller 1.

Each sector 4 may be a one-piece sector, i.e., consisting of a single piece, and made by cast-molding. Alternatively, the body 5 and the vane 2 of each sector 4 are made separately, for example cast-molded, forged or machined and then assembled for example, by welding.

In the following, a direction is described as being the <<radial>> direction, which is perpendicular to the axis X-X, and which passes through the axis X-X. The surfaces perpendicular to a radial direction, for example, the cylindrical surfaces of axis X-X with a circular section, and by extension the surfaces having axial symmetry around the axis X-X, for example conical surfaces, are described as <<radial>> surfaces.

The hub 3 has a first axial end 31 of outer diameter D1, and a second axial end 32, for which the outer diameter D2 is smaller than the diameter D1. During operation, the first end 31 is turned towards the upstream side of the flow and the second end 32 is turned towards the downstream side. This orientation is valid for a use of the propeller 1 in a turbine mode and in a pump mode. The diameter D1 corresponds to the maximum diameter of the hub 3, between the axial ends 31 and 32. A radial sidewall of the hub 3 is noted as 30, which extends between the ends 31 and 32. The radial wall 30 is axisymmetrical, i.e. it has a symmetry of revolution around the axis X-X.

The radial wall 30, at the first end 31 of the hub 3, is radially extended towards the inside of the hub 3, i.e. towards the axis X-X, through a first annular wall 33 perpendicular to the axis X-X. Holes 36 are pierced in the first wall 33 in order to assemble, for example, by means of bolts, the propeller 1 to a transmission shaft which is an input or output shaft, depending on the type of the hydraulic machine. An annular groove 7, the bottom of which is perpendicular to the axis X-X and for which the side walls are parallel to the axis X-X, is cut in the first wall 33. The groove 7 extends in a plane perpendicular to the axis X-X. The outer shape of the radial wall 30 is obtained by rotating a slightly curved sector around the axis X-X.

A second annular wall 34 of the hub 3, perpendicular to the axis X-X, protrudes inside the hub 3 towards the axis X-X. The second wall 34 is located at about one third of the height of the hub 3 measured along the axis X-X, on the side of the second end 31, but alternatively, the second wall 34 may be shifted towards the end 31 or 32 of the hub 3. Holes 37, more particularly visible on the sector 4 of FIG. 3, are pierced in the wall 34 and are made along two concentric circular contours. As explained in more detail subsequently, the second wall 34 forms an attachment plate.

As shown in FIG. 3, each body 5 has the shape of a conical portion, which extends over 72°, between a first side edge 51 and a second side edge 52 of the body 5.

The side edges 51 and 52 are planar and once the propeller 1 is assembled, these planes are oriented radially, i.e. they are parallel to the axis X-X and pass through the axis X-X. Alternatively, the side edges 51 and 52 may have any geometry, for example be curved or spiral-shaped, insofar that once the sectors 4 are assembled, the edges 51 and 52 of the sectors 4 are in contact with each other.

A radial sidewall of the body 5 of each sector 4 is noted as 50. Each body 5 is extended towards the axis X-X through a first projection 53 and a second projection 54 which, once the sectors 4 are assembled, form together the first wall 33 and the second wall 34 of the hub 3, respectively.

The subsequent description relates to a method for assembling the propeller 1 by means of a ring 6 and of a washer 9.

In FIG. 3, the portions of the ring 6 and of the washer 9 which, once the sectors 4 are assembled, are not in contact with the sector 4 of FIG. 3, are illustrated as axis dashed lines. The ring 6 has a rectangular section, and is housed in the groove 7. The washer 9 is pierced with holes 97, made along two concentric circular contours which correspond to the holes 37 of the second wall 34. Alternatively, the number of circular contours may be greater than or less than two.

In a first assembling step, the ring 6 is shrunk on. To do this, the ring 6 is heated and expands. Next the ring 6 is inserted into the groove 7, as illustrated by the arrow F1 in FIG. 3. When the ring 6 cools down, its diameter decreases and the rings 6 clasp the sectors 4 together at the projections 53, which bear against each other in order to form the first wall 33, which maintains them in position. The resulting force of the shrinking of the rings 6 is perpendicular to the axis X-X, and is absorbed by the first wall 33 as well as by the side edges 51 and 52. It is observed that the outer diameter of the groove 7 is greater than the external diameter of the ring 6, which allows placement of the rings 6 in the groove 7 when the ring 6 is expanded by the heat.

In a second assembling step, the washer 9 is assembled to the second projection 54 of each sector 4, by means of bolts 10 each comprising a screw 11, which cooperates with one of the holes 37 of the second projection 54, with one of the holes 97 of the washer and with a nut 12. In FIG. 3, a single bolt 10 is illustrated, it being understood that other bolts 10, in practice, cooperate with each of the holes 37 and 97. The placement of the washer 9 on the different projections 54, on the side of the end 31 of the hub 3, is illustrated by the arrow F2 in FIG. 3. Alternatively, the washer 9 may be placed on the other face of the projections 54, i.e. on the side of the end 32 of the hub 3. The tightening of the nuts 12 of each bolt 10 allows the frictional force to be adjusted between the washer 9 and the second projections 54 for controlling the assembling. The washer 9 thus forms an element for assembling the sectors 4.

Once the assembling of the propeller 1 is achieved, the first side edge 51 and the second side edge 52 of the sidewall 50 of the body 5 of each other sector 4 is respectively in contact with the second side edge 52 and the first side edge 51 of both of the adjacent sectors 4.

In a known way, shrinking is not suitable for hubs of small diameter since the diameter of the ring is then too small for its expansion to be sufficient and to allow its placement around the sectors, while providing a sufficient tightening force. On the other hand, in the case of small diameter hubs, the geometry of the downstream end of the hub does not generally allow installation of a shrunk-on ring, for reasons of congestion.

The assembling of the sectors 4 by means of the ring 6 and of the washer 9 is particularly adapted for propellers 1 of conical shape or globally conical shape since the ring 6 is shrunk on at the first end 31, which is the end of large diameter. The invention allows a relatively significant conicity of the hub 3 since the second end 32 of the hub 3, which is the end of small diameter, is not shrinked. Thus, by means of the invention, the diameter D2 is relatively small, which allows reduction in the bulkiness of the hub 3. Further, reducing the diameter D2 has a favorable impact on the hydraulic behaviour of the propeller 1. Within the scope of the invention, the diameter D2 of the second end 32 may be zero, in which case the second end is spike-shaped.

Therefore, by means of the invention, a ratio having as a denominator, the diameter D1 and as a numerator, the diameter D2, is relatively small.

Moreover, the assembling of the washer 9 on-site is relatively easy since it is sufficient to have the washer 9 appear on the projections 54 and then to place the bolts 10, without needing to provide bulky equipment and which is complicated to apply. Further, it is unnecessary to modify the geometry of the radial wall 30 of the hub 3 or its dimensions for attaching the washer 9, since it is assembled by means of bolts 10 on the second wall 34 which is specially provided for this purpose, and which is positioned inside the hub 3. Moreover, the number of sectors 3 may be odd or even.

The hub 3 is globally frusto-conical but alternatively, it may have any geometry, for example cylindrical geometry with a circular or polygonal base, or conical with a polygonal cross-section. In this case, the diameters D1 and D2 correspond to a maximum radial or transverse outer dimension of the hub 3, i.e. measured perpendicularly to the axis X-X. For example, in the case of a hub with a square section, the maximum outer dimension of the hub corresponds to the diagonal of the square section.

Alternatively, when the hub 3 is not frusto-conical, the washer 9 is not ring-shaped. For example, the washer 9 may be of a square, hexagonal or polygonal shape depending on the shape of the radial wall 30 of the hub 3 and of the second wall 34.

Alternatively, the washer 9 is assembled to the second wall 34 by means of pins or by a combination of pins and of bolts. The pins are forcibly driven into the holes 37 and 97, and are provided for absorbing radial loads.

Alternatively, two washers 9 are used for assembling the propeller 1 and are assembled on either side of the second wall 34. The number of washers 9 may also be greater than two. Thus, the propeller 1 includes at least one washer 9.

Alternatively, the body 5 of each sector 4 comprises two projections 54 distributed between the first end 31 and the second end 32 of the hub 3. In this case, one or two washers 9 may be used for assembling together the projections 54 which, once the sectors 4 are assembled, form together one of the two second walls 34.

Alternatively, certain of the sectors 4 do not include any vane 2. For example one sector 4 out of two may not include any vane 2.

Alternatively, the propeller 1 includes one or several other rings similar to the ring 6 and shrunk on around the bodies 5 of the sectors 4.

Alternatively, the number of sectors 4 is different from five. For example, the propeller 1 may be made by assembling between three and twelve sectors. In this case and when the edges 51 and 52 are planar, each body 5 extends over an angular sector equal to 360° divided by the number of sectors 4.

Alternatively, the number of vanes 2 is different from five.

Alternatively, the groove 7 may be cut into the radial wall 30, with its sides perpendicular to the axis X-X. However, the ring 6 is then exposed to water, which may contribute to its degradation. Further, the continuity between the radial wall 30 and the ring 6 risks being not ensured, and a spacing between the radial wall 30 and the ring 6 risks being created, which causes vortices and cavitation. These drawbacks are avoided by the arrangement of the groove 7 as shown in the figures, since the end of the radial wall 30 located on the side of the first end 31 of the hub 3 protects the ring 6 from water.

The different alternative embodiments described above may be combined together, either totally or partly in order to provide other embodiments of the invention.

The invention claimed is:
1. A propeller for a hydraulic machine, intended to be crossed by a flow, the propeller including a hub extending along an axis of rotation of the propeller and vanes extending from the hub, the propeller consisting of at least three sectors each including a body which, once the sectors are assembled, form together the hub, and each vane being firmly attached to the body of a sector, the sectors being assembled together in order to form the propeller by means of at least one shrunk-on ring which is placed around the bodies of the sectors, wherein the hub is hollow, wherein each sector comprises a side wall and a projection which is firmly attached to the side wall and which protrudes towards the inside of the hub, perpendicularly to the axis, and wherein the sectors are further assembled together in order to form the propeller by means of at least one washer assembled to the projection of each sector, inside the hub, by means of added attachment elements, and wherein once assembled together, the projections inside the hub form an annular ring.

2. The propeller according to claim 1, wherein the hub is globally frusto-conical and has a first axial end turned towards the upstream of the flow and a second axial end turned towards the downstream of the flow, the maximum external radial dimension of which, measured perpendicular to the axis, is less than the maximum external dimension of the first axial end.

3. The propeller according to claim 2, wherein the ring is shrunk on at the first axial end of the hub.

4. The propeller according to claim 3, wherein the first axial end of the hub is extended towards the axis with a wall which comprises a groove for receiving the ring, the groove extending in a plane perpendicular to the axis.

5. The propeller according to claim 1, wherein the attachment elements are formed by bolts and/or pins.

6. The propeller according to claim 1, wherein the sectors are one-piece sectors.

7. The propeller according to claim 6, wherein the one-piece sectors are made by cast molding.

8. The propeller according to claim 1, wherein the sectors are made by assembling one of the vanes to one of the bodies.

9. A hydraulic machine equipped with a propeller according to claim 1.

10. A method for assembling a propeller according to claim 1, comprising steps wherein the ring is shrunk on around the body of each sector, and the at least one washer is assembled to the projection of each sector.

11. The assembling method according to claim 10, wherein the at least one washer is assembled to the projection of each sector by means of the added attachment elements.

12. The assembling method according to claim 11, wherein the added attachment elements are bolts and/or pins.

13. The propeller according to claim 1, wherein the sectors are made by welding one of the vanes to one of the bodies.

* * * * *